C. M. PETERSON.
MUFFLER.
APPLICATION FILED JUNE 25, 1914.
1,203,777.
Patented Nov. 7, 1916.
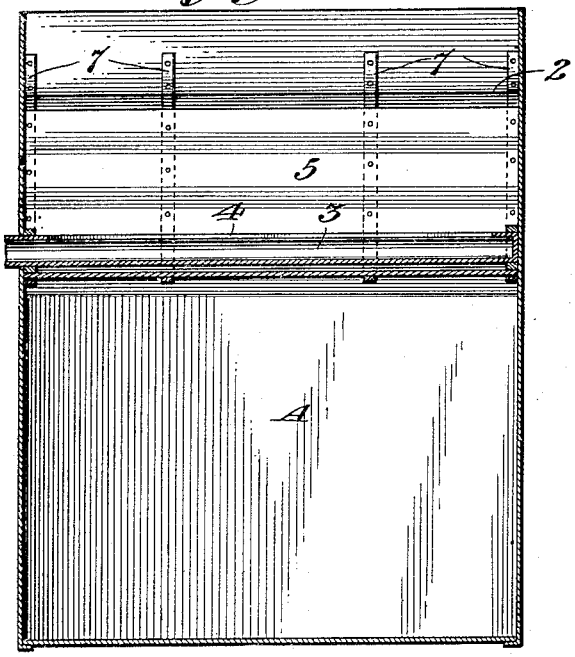
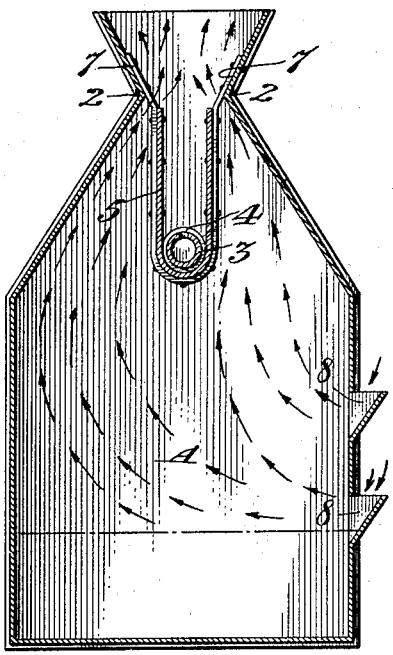
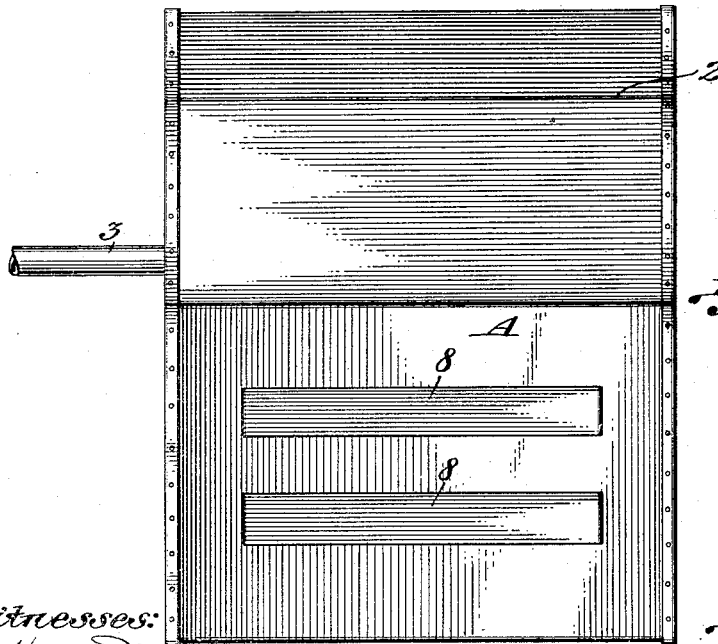
Witnesses:
A. A. Hammond
Frank H. Borden
Inventor:
Carl M. Peterson
By E. C. Brandenburg
Atty.

UNITED STATES PATENT OFFICE.

CARL M. PETERSON, OF CHESTER, MONTANA.

MUFFLER.

1,203,777. Specification of Letters Patent. Patented Nov. 7, 1916.

Application filed June 25, 1914. Serial No. 847,264.

*To all whom it may concern:*

Be it known that I, CARL M. PETERSON, a subject of the King of Great Britain, residing at Chester, in the county of Hill and State of Montana, have invented certain new and useful Improvements in Mufflers, of which the following is a specification.

My invention relates to an improvement in mufflers, and the object is to provide means for cooling the hot gases issuing from the exhaust pipe of a gas engine.

The invention relates to still other novel features of construction and combinations of parts which will be hereinafter more fully described and pointed out in the claims.

In the accompanying drawings: Figure 1 is a longitudinal vertical sectional view; Fig. 2 is a transverse sectional view; and Fig. 3 is a view in side elevation.

A represents a cooling tank, containing water or other cooling medium. The upper portion of the tank extends inwardly, so that the sides form a constriction as at 2. The sides then project upwardly and outwardly, producing a V-shaped formation. Extending through the upper portion of the tank is an exhaust pipe 3, which has an elongated slot 4 in the upper surface thereof.

A trough 5 is received in the neck or upper portion of the tank, and extends below the constriction 2, and the exhaust pipe 3 extends therethrough. The trough is open at its ends, but collars are formed at the ends through which the exhaust pipe 3 extends to form an air space entirely around the exhaust pipe. The upper edges of the trough are connected by means of straps 7 to the top of the tank, whereby the trough is supported within the tank.

Located along the wall of the tank are two openings having spouts 8, 8 connected thereto, through which air is admitted to the tank, so that the cool air will pass into the tank and take up a certain amount of moisture from the liquid contained in the tank, and as the moistened air or vapor passes around the trough to the upper end of the tank, it will become heated for the purpose of keeping the trough cool and at the same time absorb some of the gases issuing therefrom.

From the foregoing, it will be seen that I have provided a simple apparatus whereby the air will cool the chamber into which the exhaust gases are discharged, and at the same time absorb the gases.

The formation of an air space about the exhaust pipe with the water chamber located beneath the air space produces a means for deadening the exhaust.

I claim:

A muffler comprising a liquid-tank having air inlets adjacent to the liquid, a U-shaped trough suspended in the upper end thereof, and an exhaust-pipe extending throughout the U-shaped trough with an air-space therearound, and having an outlet in its upper side, whereby the exhaust causes an inflow of cold air over the liquid in the tank, which becomes moistened and passes around the trough for keeping the trough cool and absorbing the gases issuing therefrom.

In testimony whereof I affix my signature, in the presence of two witnesses.

CARL M. PETERSON.

Witnesses:
FRANK W. TURCOTTE,
E. J. BLANCHARD.

Copies of this patent may be obtained for five cents each, by addressing the "Commissioner of Patents, Washington, D. C."